United States Patent
Kuzmenka et al.

(10) Patent No.: US 7,206,978 B2
(45) Date of Patent: Apr. 17, 2007

(54) ERROR DETECTION IN A CIRCUIT MODULE

(75) Inventors: Maksim Kuzmenka, Munich (DE); Siva Raghurma, Germering (DE)

(73) Assignee: Infineon Technologies AG, Munich (DE)

( * ) Notice: Subject to any disclaimer, the term of this patent is extended or adjusted under 35 U.S.C. 154(b) by 185 days.

(21) Appl. No.: 10/857,596

(22) Filed: May 27, 2004

(65) Prior Publication Data
US 2005/0022074 A1 Jan. 27, 2005

(30) Foreign Application Priority Data
May 28, 2003 (EP) .................. 03012064

(51) Int. Cl.
*G06F 11/00* (2006.01)
(52) U.S. Cl. ....................................................... 714/56
(58) Field of Classification Search ................. 710/22, 710/26–27, 52; 714/48, 49, 52–54, 56, 768, 714/769, 799–801, 805
See application file for complete search history.

(56) References Cited

U.S. PATENT DOCUMENTS

| | | | |
|---|---|---|---|
| 4,360,917 A | 11/1982 | Sindelar et al. | |
| 5,173,905 A * | 12/1992 | Parkinson et al. | 714/768 |
| 5,423,030 A | 6/1995 | Byers et al. | |
| 6,137,734 A * | 10/2000 | Schoner et al. | 365/194 |
| 6,496,946 B2 * | 12/2002 | Bannatyne et al. | 714/25 |
| 6,941,493 B2 * | 9/2005 | Phelps | 714/53 |

OTHER PUBLICATIONS

Error Correction and Detection (Wikipedia definition).*
Identify RAM Chips, Skeeterbytes.com.*
DIMM, Computers, the Past, Present, and Future.*

* cited by examiner

*Primary Examiner*—Khanh Dang
(74) *Attorney, Agent, or Firm*—Slater & Matsil, L.L.P.

(57) ABSTRACT

A circuit module has a module board and a plurality of circuit chips that are arranged on the module board. A module main bus having a plurality of lines of the circuit module branches into a plurality of sub-buses having a plurality of lines. Each of the sub-buses is connected to one of the circuit chips. Each circuit chip has an indication signal generating unit for providing an indication signal based on a combination of the signals received on the plurality of lines of the sub-bus connected to the respective circuit chip, and an indication signal output for outputting the indication signal.

14 Claims, 4 Drawing Sheets

ERROR DETECTION IN A CIRCUIT MODULE

BACKGROUND OF THE INVENTION

1. Field of the Invention

The present invention relates to a circuit module and, in particular, to an error detection in a circuit module comprising a module board and a plurality of circuit chips arranged on the module board.

2. Description of the Related Art

A conventional structure of computer main memory systems includes a memory controller, a main memory bus and memory chips, DRAM chips for example, that are arranged on memory modules, DIMMs (DIMM=Duals In-Line Memory Module) for example. The main memory bus connects the memory modules to the memory controller. In general, the main memory bus comprises a data bus, a command/address bus, and lines carrying clock signals and check signals.

Conventionally, error detection and correction on the main memory bus is done on the data bus only, by including additional bits or even chips and by using special algorithms for processing data received via the data bus.

Some prior art computer main memory systems comprise additional error detection means to detect errors on the command/address bus. In such systems, the memory controller generates a check signal which is driven to the memory modules. Each memory module comprises an error detection unit that detects an error on the command/address bus by making use of the check signal. In case of a detected error, the error detection unit generates an error signal that is driven back to the memory controller.

FIG. 1 shows a schematic view of such a prior art memory module. The memory module is in the form of a registered DIMM. The memory module comprises a module board 100, a plurality of memory chips (DRAMs) 102, a buffer or register 104 and a connector portion 106. The connector portion 106 is connected to the buffer or register 104 via a module main bus 108. At the output of the buffer or register 104, the module main bus 108 branches into sub-busses 110 each of which being connected to one of the memory chips 102.

The connector portion 106 comprises a plurality of terminals 120 to 124 to receive or drive a plurality of signals from or to a memory bus on a motherboard (not shown) to which the memory module is connected. A clock signal CLK is applied at terminal 120, address signals A0 and A1 are applied at terminals 121 and 122, a check signal Parity IN is applied at terminal 123 and an error signal Parity OUT is applied at terminal 124. In FIG. 1 only those components necessary to explain the functionality of interest, i.e. the components associated to the command/address bus are shown. Moreover, for simplicity, only two address bits A0 and A1 of the command/address bus are shown, while usual command/address busses comprise 24 to 27 bits.

The buffer or register 104 comprises buffer or register elements, drivers 130, 131 and 132 and an error detection circuit, comprising XOR-gates 141 and 142.

The drivers 130 and 131 are operable to drive the address lines and are controlled by the clock signal CLK.

First and second inputs of the first XOR-gate 141 are connected to the terminals 122 and 123, respectively. Thus, the memory bus signals A1 and Parity IN provide the input signals for the first XOR-gate 141. The output 145 of the first XOR-gate 141 is connected to a first input of the second XOR-gate 142 which is also connected to the terminal 121. The terminal 121 provides the A0 bit, which is the next less significant bit of the memory bus bits. The output 146 of the second XOR-gate 142 is connected to the driver 132 which samples the output 146 with the signal CLK. The output of the driver 132 is connected to the terminal 125 which applies the error signal Parity OUT to the memory bus.

The error detection circuit provides error detection by way of parity checking. The check signal Parity IN provides a parity bit for the memory bus signal bits A0 and A1 that is generated and provided by a memory controller (not shown). The value of the parity bit depends on the number of "1" bits on the memory bus signals A0 and A1, at a time. If there is an odd number of "1" bits, the corresponding parity bit has a high value, otherwise if there is an even number of "1" bits, the parity bit has a low value. The Parity Checking is done by way of XOR-gates. There are as many XOR-gates as there are bits on the memory command/address bus. The output of each XOR-gate and the next less significant command/address bus bit, referred to the command/address bus bit taken as input for the current XOR-gate, are taken as input for the next XOR-gate. The output bit of the last XOR-gate is an error bit and is driven back to the memory controller.

The Signal Parity OUT has a low value as long as there is no error detected on the module main bus 108 by the error detection circuit. In case of a single bit error the Signal Parity OUT will turn to an high value. A memory controller that checks the Signal Parity OUT can therefore detect single bit errors on the memory bus. Multiple bit errors cannot be detected for sure.

The error detection method as described in FIG. 1 is restricted to registered (buffered) memory modules and has the disadvantage that errors that occur on one of the sub-busses 110 are not detected.

The complexity of non-protected sub-buses on a memory module of a kind as shown in FIG. 1 is illustrated in FIG. 2. FIG. 2 shows a schematic view of a computer main memory system comprising a memory controller 200 and a plurality of memory modules 202 in the form of registered DIMMs. The memory controller 200 is connected to a main memory bus 204, which branches into a plurality of memory busses 206 each of which is connected to one of the memory modules 202. The main memory bus 204 is terminated by a termination resistor 208.

Each memory module 202 comprises a plurality of memory chips 210 in the form of DRAM chips. To be more specific, in the embodiment shown in FIG. 2 four memory modules 202 are shown and nine memory chips 210 are arranged on each memory module 202. Each memory module 202 comprises a buffer or register 212 that comprises error detection circuit elements as described in FIG. 1. (The error detection circuit elements are not shown in particular in FIG. 2.) On each memory module 202 a module main bus 214 connects the respective memory bus 206 to the buffer or register 212. At the output of the buffer or register 212 the module main bus 214 branches into a plurality of sub-busses 216 each of which is connected to one of the memory chips 210. This high number of sub-busses 216 is not protected by the error detection circuit elements that are embedded in the registers 210. Thus, as outlined above, errors that occur on command/address lines of the sub-busses 216 cannot be detected according to this prior art approach.

SUMMARY OF THE INVENTION

In one aspect, the present invention provides a circuit module comprising a plurality of circuit chips that allows improved error detection.

In accordance with a first aspect, the present invention provides a circuit module having a module board; a plurality of circuit chips arranged on the module board; a main bus having a plurality of lines, branching into a plurality of sub-buses having a plurality of lines, each of the sub-busses being connected to one of the plurality of circuit chips; wherein each circuit chip has an indication signal generating unit for providing an indication signal based on a combination of the signals received on the plurality of lines of the sub-bus connected to the respective circuit chip, and an indication signal output for outputting the indication signal.

In accordance with a second aspect, the present invention provides a memory chip having a memory bus input for receiving signals from a memory bus having a plurality of lines; wherein the circuit chip has an indication signal generating unit for providing an indication signal based on a combination of the signals received on the plurality of lines of the memory bus connected to the circuit chip, and an indication signal output for outputting the indication signal.

The present invention is based on the finding that in new generations of memory systems that provide high data rates, errors that happen on a command/address bus on a memory module become significant for the error rate of the whole system.

Therefore, according to the inventive arrangement, indication signal generating units are embedded within each circuit chip of a circuit module (a memory module, for example). Each circuit chip is connected to a sub-bus (a memory command/address sub-bus, for example) having a plurality of lines. The indication signal generating units comprise check sum calculation means that allow to indicate an error on the lines of the sub-bus connected to the respective circuit chip by way of calculating a check sum of the signals of the sub-bus and by providing an indication signal.

In a first embodiment, means for providing a check signal to each of the circuit chips are provided, wherein, in the circuit chips, the check sum and the check signal are combined to form the indication signal, which, in this case, represent an error signal.

In alternative embodiments, error detection is provided downstream by comparing the indication signal with a check signal that provides checksum information for the signals of the memory sub-bus and is provided by a memory controller. Means for comparing the indication signal with the check signal provide a module error out signal that informs the memory controller about a detected error. The means for comparing can be arranged, on the module board or even in the memory controller.

Arranging the means for comparing outside the circuit chip has the advantage that resources of the circuit chip, otherwise used for providing and combining the check signal to the sub-bus signals are available for additional features.

The advantage of the inventive method is that errors on a command/address bus of a computer main memory system are detected irrespective of whether same occur before or after a buffer or register on a registered memory module (a registered DIMM, for example) and the method also works for un-registered memory modules. The inventive approach of error detection allows to detect errors occurred on the command/address bus between a memory controller and each of the memory chips (DRAMs, for example) on the memory modules. In case of a detected error, it allows the memory controller to repeat sending data, reduce the data rate or change parameters like slew rate or drive strength.

In a preferred embodiment the memory chips are grouped in groups or banks of memory chips and an individual indication out or module error out signal is generated for each group. This provides the memory controller with detailed information about the location an error occurred.

In case of highly stable system requirements, each individual memory chip may have a separate indication or error bit reporting to the memory controller.

In a further embodiment error detection circuit elements in a buffer or register on a module board, according to the prior art, are combined with error detection means, according to the present invention. This combination provides exact information about the source on an error.

BRIEF DESCRIPTION OF THE DRAWINGS

Preferred embodiments of the present invention are described hereinafter making reference to the appended drawings.

DESCRIPTION OF PREFERRED EMBODIMENTS

Figure 3:
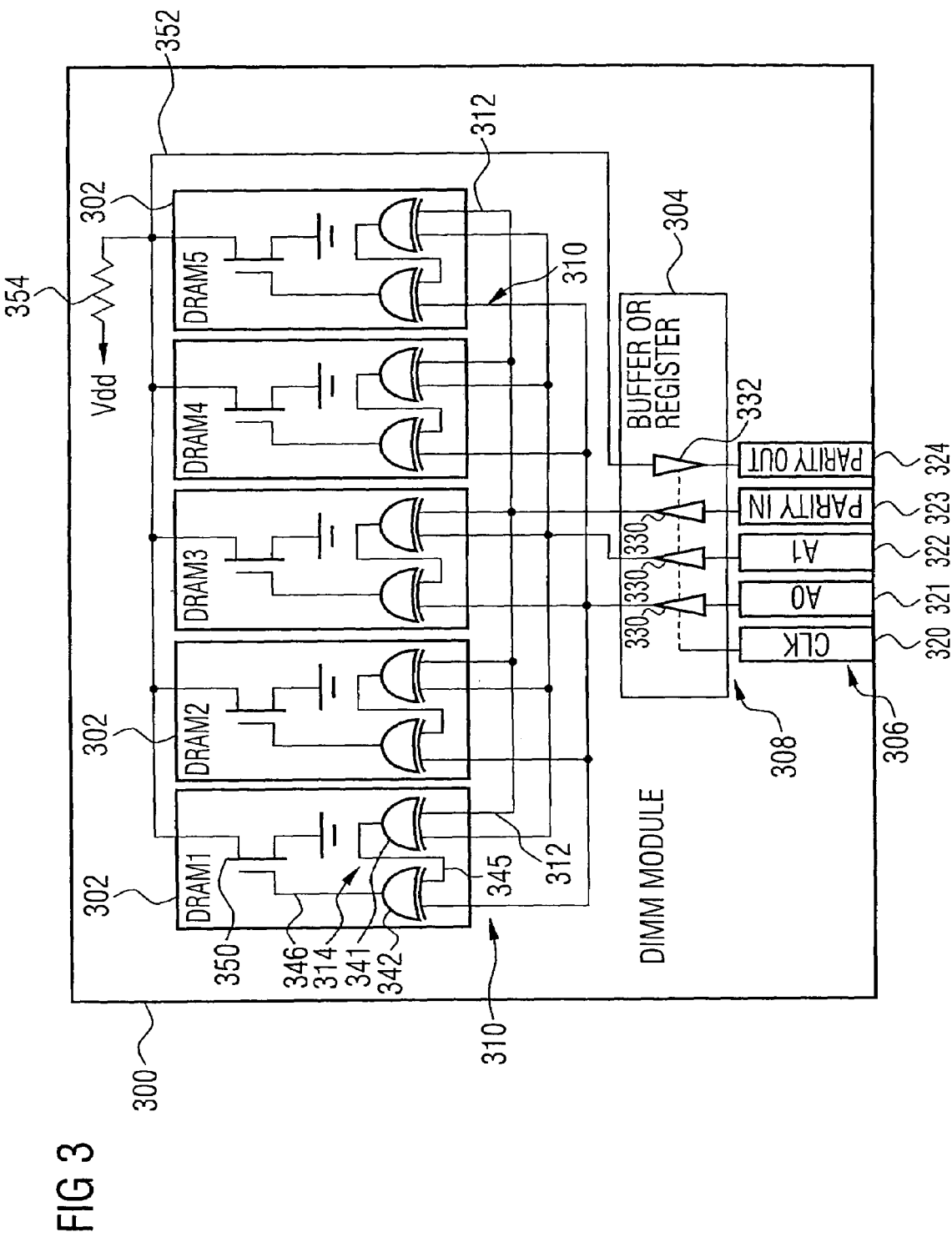
FIG. 3 shows a schematic view of a memory module embodying the present invention.

FIG. 3 shows a schematic view of a memory module, according to the present invention. The memory module is in the form of a registered DIMM. The memory module comprises a module board 300, a plurality of memory chips (DRAMs) 302, a buffer or register 304 and a connector portion 306. The connector portion 306 is connected to the buffer or register 304 via a module main bus 308. At the output of the buffer or register 304, the module main bus 308 branches into sub-busses 310 each of which being connected to one of the memory chips 302. Each sub-bus 310 comprises a check signal line 312, which provides a check bit to an indication signal generating unit 314 that is embedded in each memory chip 302.

The connector portion 306 comprises a plurality of terminals 320 to 324 to receive or drive a plurality of signals from or to a memory bus on a motherboard (not shown) to which the memory module is connected. A clock signal CLK is applied at terminal 320, address signals A0 and A1 are applied at terminals 321 and 322, a check signal Parity IN is applied at terminal 323 and an error signal Parity OUT is applied at terminal 324. In FIG. 3 only those components necessary to explain the invention, i.e. the components associated to the command/address bus are shown. Moreover, for simplicity, only two address bits A0 and A1 of the command/address bus are shown, while usual command/address busses comprise 24 to 27 bits.

The buffer or register 304 comprises buffer or register elements, input drivers 330 and an output driver 332.

The inputs of the drivers 330 are connected to the terminals 321, 322 and 323. The drivers 330 and 332 are also connected to the terminal 320 to be supplied with the clock signal CLK. At the output of the drivers 330 the module main bus 308 branches into the sub-busses 310, each of which is connected to one of the memory chips 302.

Usually each DRAM chip 302 comprises on the input a latch device, which latches command/address signals 321 and 322 with a rising edge of a clock signal. The indication signal generating unit 314 is arranged downstream of this latch, in order to prevent that slight differences in an arrival time of the command/address signals 321 and 322 generate short glitches on an output of the indication signal generating unit 314. For sake of simplicity, this latch device is not shown in the figures.

In the embodiment shown in FIG. 3, the indication signal generating unit 314 comprises two XOR gates 341 and 342. The first XOR-gate 341 is connected to a sub-bus signal line that provides the signal A1 and to the check signal line 312. Both lines provide the input bits for the first XOR-gate 341. Bit A1 is the most significant of the command/address sub-bus bits. The output 345 of the first XOR-gate 341 is connected to the second XOR-gate 342, which is additionally connected to the sub-bus signal line that provides the signal A1, which is the next less significant bit of the command/address sub-bus bits. The second XOR-gate 342 outputs an indication signal 346 that is connected to an open-drain output buffer 350.

In this embodiment the indication signals 346 are generated in the indication signal generating units 314 by calculating a check-sum of the command/address signals 321 and 322 of the sub-busses 310 and by combining the check signal 312 with the calculated check-sums. Due to the distributive law, the result of the combining is not affected by the ordering of the signals being combined. The check signal 312 is provided by the memory controller and is a pre-calculated check bit, representing a parity bit for the command/address signal 321 and 322. Thus, in this embodiment the indication signal generating unit 314 is configured to indicate and to detect and error on the address/command signals 321 and 322 and the generated indication signal 346 represents therefore an error signal.

In this embodiment, the output buffers 350 of all memory chips 302 are connected to an error signal line 352. In case there is no error detected, the error signal at line 352 has a high value, due to a pull-up resistor 354 that is connected to the error signal 352. In case of an error detected by an indication signal generating unit 314 in any of the memory chips 302, the error signal 352 is pulled down to a low value by the output buffer 350 of the respective memory chip 302 the error was detected in. As all output buffers 350 are connected together, an error is indicated by the error signal 352 independently of being detected in one of the indication signal generating units 314 or in several of the indication signal generating units 314. The error signal line 352 is connected to the output driver 332. The output of the driver 332 is connected to the terminal 325, which applies the error signal Parity OUT to the memory bus.

In cases the error signal line 352 could be not fast enough to deliver one bit long error signal back to the register/buffer 304, it might be preferable to include a pulse time expander (not shown) between the output of the XOR gate 342 and the gate of the transistor 350. The pulse time expander represents a sticky bit unit that can be implemented by way of a flip-flop which is set-up by the indication signal 346, independently of the duration the indication signal 346 is driven, and reset back to normal state after a defined time period (after a number of clock cycles counted by a counter, for example) or a special command provided on the command/address bus.

In operation, the memory controller receives information about an error occurred on command/address bus lines anywhere between the memory controller and the circuit chips.

In the embodiments shown in FIG. 3, the error signal output of the DRAMs represent the indication signal of the inventive circuit module or memory chip. Alternatively, the indication signal can be formed by combining the signals on the lines of a respective sub-bus only as it is described hereinafter making reference to FIGS. 4 and 5.

Figure 4:
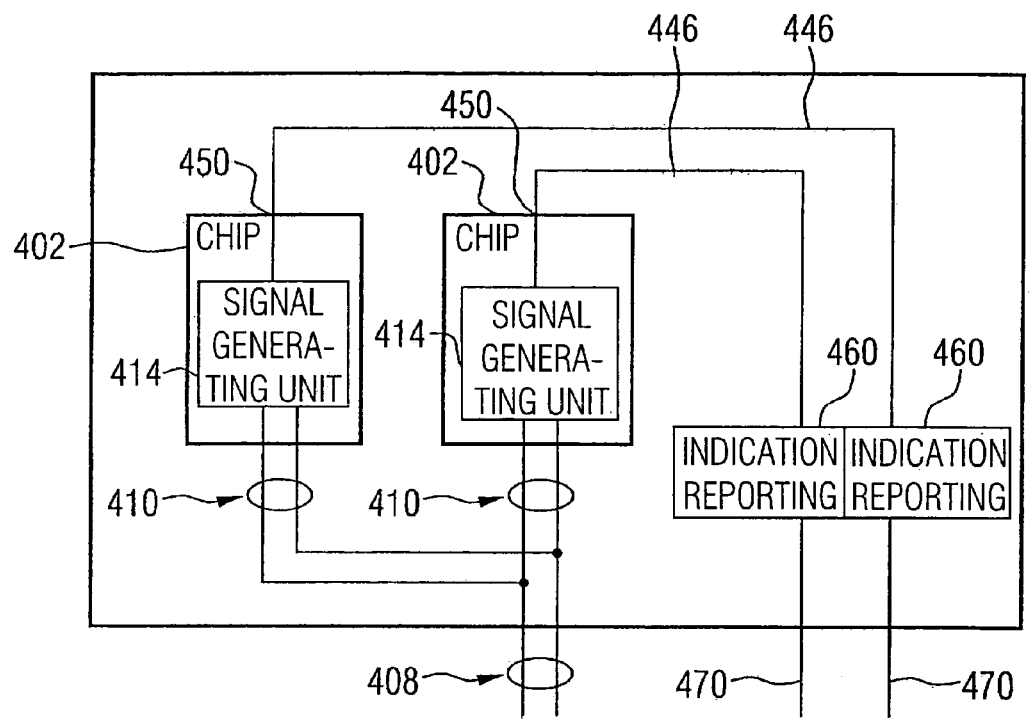
FIG. 4 shows a schematic view of a further preferred embodiment of a memory module according to the present invention.

FIG. 4 shows a circuit module according to a preferred embodiment of the invention in that an indication signal is formed by combining signals on lines of a respective sub-bus.

A circuit module comprises a module board 400 and two circuit chips 402 that are arranged on the module board 400. A main bus 408 branches into two sub-busses 410. Each sub-bus 410 has a plurality of lines that are connected to an indication signal generating unit 414 that is arranged in each circuit chip 402. The indication signal generating units 414 combine the signals of the respective sub-bus 410 that is connected to the indication signal generating unit 414 and provide an indication signal 446, each. Each indication signal line 446 is driven by a indication signal output 450 and connected to an indication reporting means 460 that is configured to drive an module indication out signal 470.

A value of the indication signal 446 at a time depends on the number of "1" bits that are driven on the lines of the sub-bus 410. Thus, the indication signal generating unit 414 calculates a check sum of the bits of the sub-bus 410. This check-sum bit is driven back via the indication signal 446 and the module indication out signal 470 to a memory controller (not shown) which compares the received module indication out signal bit 470 with a pre-calculated check-sum bit. If the two bits do not coincide, an error has occurred.

Figure 5:
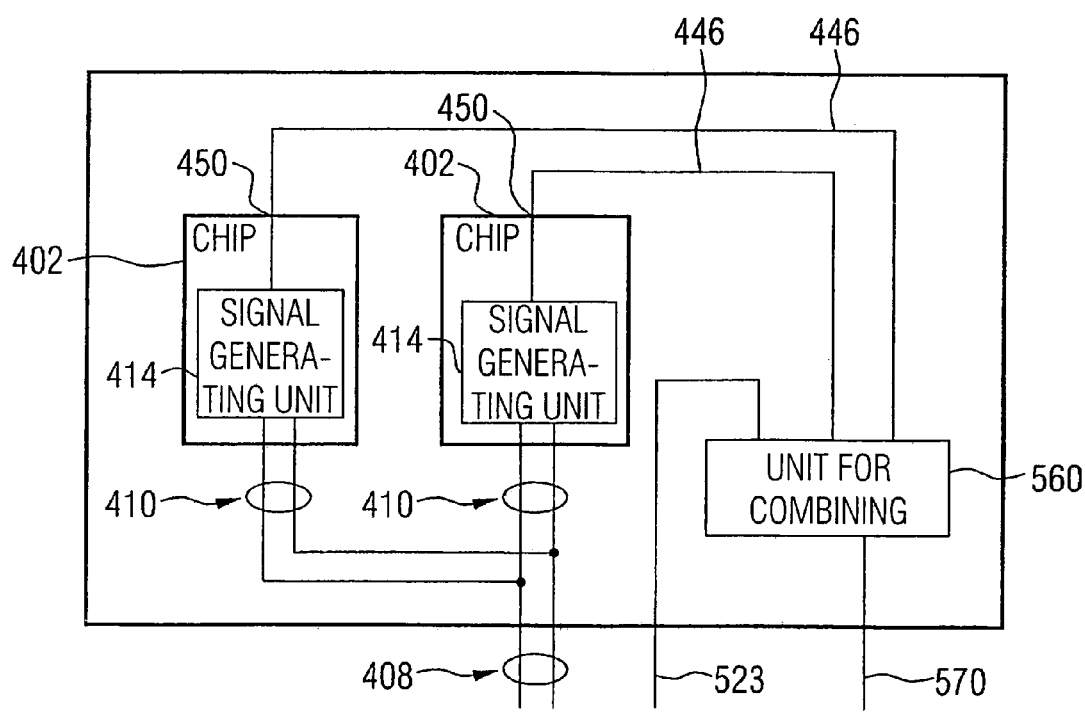
FIG. 5 shows a schematic view of another preferred embodiment of a memory module according to the present invention.

FIG. 5 shows another embodiment in that an indication signal is formed by combining signals on lines of a respective sub-bus. Objects corresponding to objects shown in FIG. 4 have the same reference number and are not described hereinafter.

In addition to the embodiment shown in FIG. 4, a module board 500 comprises a check signal 523 that is provide by a memory controller (not shown) as described in FIG. 3. The check signal 523 is connected to an unit for combining 560 which is arranged on the module board 500. Two indication signals 446 are provided in the was as can be seen from FIG. 4. The indication signal lines 446 are connected to the unit for combining 560, too.

The unit for combining 560 is configured to compare the check signal 523 with each of the indication signals 446. If the check signal 523 and one of the indication signals 446 do not coincide, an error has occurred and is reported via an module error out signal 570 to the memory controller.

In a preferred embodiment, memory chips on a memory module are grouped in different groups or banks. Indication signals of indication signal generating units of memory chips belonging to the same group are combined together and connected to additional group-indicating signal lines associated to the respective group. The group-indicating signals are driven to the memory controller. Thus, there is detailed information provided about where an error has occurred.

In an embodiment for a highly stable system, each individual memory chip comprises a separate indicating bit which is set by an indicating signal generating unit in the respective memory chip. In operation, the value of the error bit is reported to a memory controller.

Figure 1:
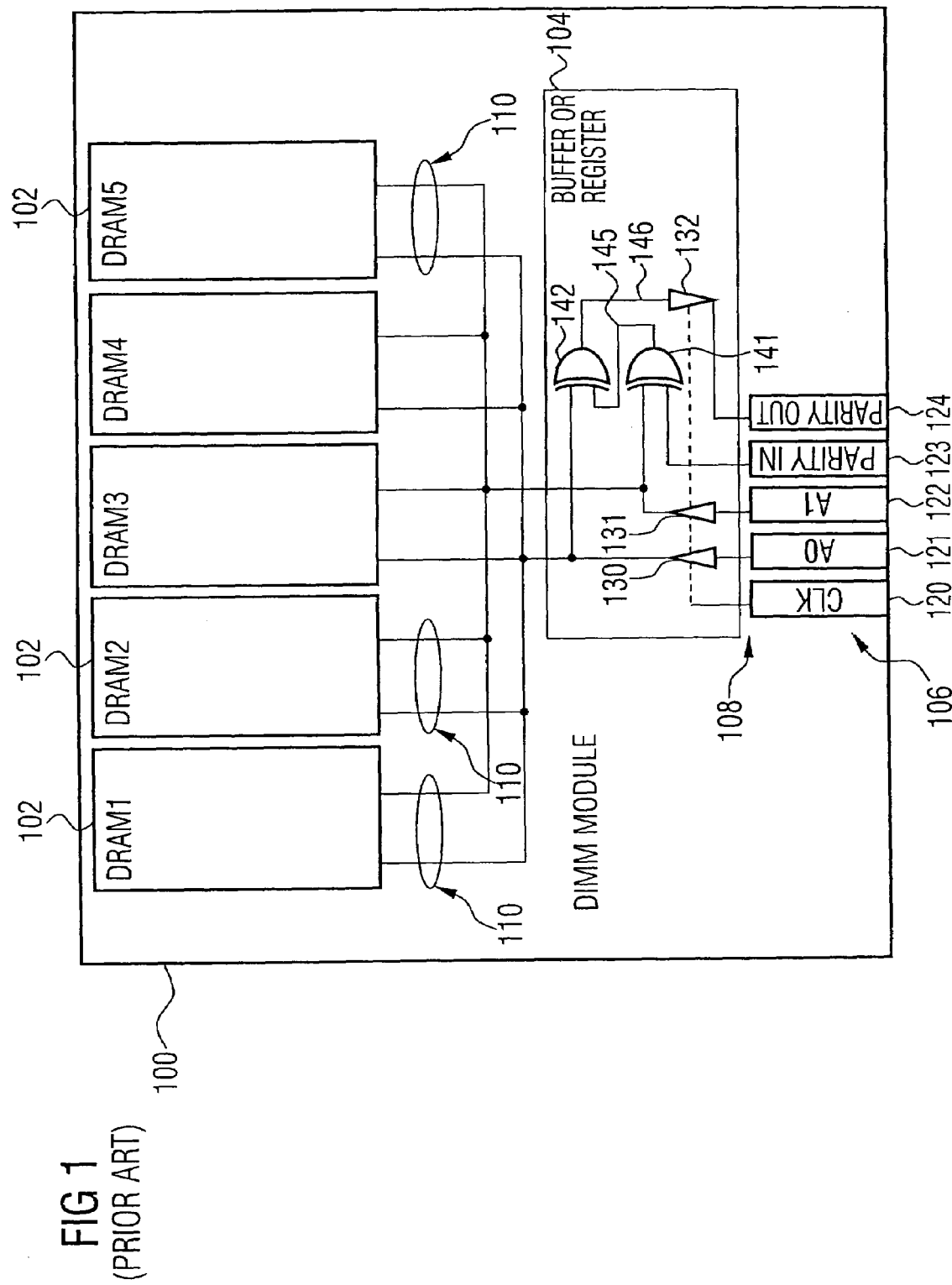
FIG. 1 shows a schematic view of a memory module according to the prior art.
Figure 2:
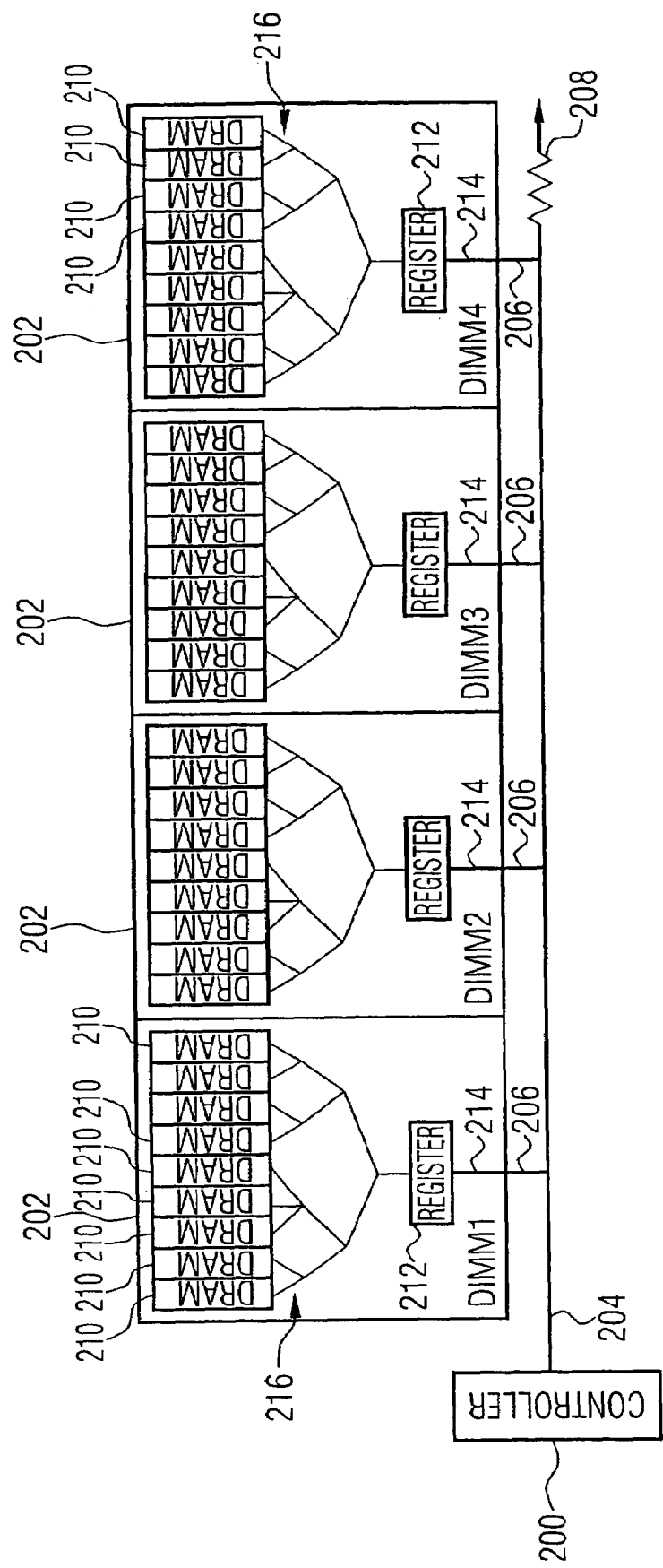
FIG. 2 shows a schematic view of a computer main memory system according to the prior art.

In a further embodiment, a memory module combines an error detection method as described in the present invention with a prior art error detection method as described in FIG. 1. Thus, in operation it can be distinguished between an error source on a memory bus or on a memory sub-bus on the memory module.

Although the present invention has been described above, making reference to memory modules, it is clear that the present invention can also be used in connection with other circuit modules which comprise circuit chips that are connected to a data bus. Additionally, the inventive arrangement of an indication signal generating unit embedded within a circuit chip can also be used for systems comprising a single circuit chip.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A circuit module comprising:
   a module board;
   a plurality of circuit units arranged on the module board, each circuit unit consisting of a single integrated circuit memory chip;
   a main bus having a plurality of lines, branching into a plurality of sub-buses having a plurality of lines, each of the sub-busses being connected to one of the plurality of circuit units;
   wherein each circuit unit comprises an indication signal generating unit for providing an indication signal based on a combination of the signals received on the plurality of lines of the sub-bus connected to the respective circuit unit, and an indication signal output for outputting the indication signal.

2. The circuit module according to claim 1, further comprising means for providing a check signal to each of the circuit unit, and wherein said indication signal generating unit generates said indication signal based on a combination of the signals on the plurality of lines of the respective sub-bus and the check signal, so that the indication signal represents an error signal.

3. The circuit module according to claim 2, further comprising an error reporting means, being connected to the indication signal outputs of the circuit units, and wherein each error reporting means is configured to drive a module error out signal.

4. The circuit module according to claim 3, wherein the error reporting means is configured to indicate the circuit unit, the error signal is received from, or to indicate a group of circuit unit, the error signal is received from.

5. The circuit module according to claim 1, further comprising a plurality of indication reporting means, each being connected to one of the indication signal outputs of the circuit unit, and wherein each indication reporting means is configured to drive a module indication out signal.

6. The circuit module according to claim 1, wherein the circuit module comprises a unit for combining the indication signal with a check signal to provide a module error out signal.

7. The circuit module according to claim 6, wherein the unit for combining is configured to indicate the circuit unit an error was detected in or to indicate a group of circuit unit, an error was detected in.

8. The circuit module according to claim 1, further comprising a main bus error detection unit for detecting errors on the main bus making use of the check signal.

9. The circuit module according to claim I, wherein each circuit unit comprises a sticky bit unit, arranged between the indication signal generating unit and the indication signal output, for holding information of the indication signal.

10. The circuit module according to claim 1, wherein the circuit module is a dual in-line memory module (DIMM), wherein the circuit units are memory units, wherein the main bus is a memory main bus, and the sub-busses are memory sub-busses.

11. The circuit module according to claim 10, wherein the memory main bus is a command/address bus.

12. The circuit module according to claim 2, wherein the check signal is a panty signal.

13. A memory unit, consisting of a single integrated circuit memory chip, comprising:
   a memory bus input for receiving signals from a memory bus having a plurality of lines;
   wherein the memory unit comprises an indication signal generating unit for providing an indication signal based on a combination of the signals received on the plurality of lines of the memory bus connected to the memory unit, and an indication signal output for outputting the indication signal.

14. The memory unit according to claim 13, comprising a check signal input for receiving a check signal, and wherein said indication signal generating unit generates said indication signal based on a combination of the signals on the plurality of lines of the memory bus and the check signal, so that the indication signal represents an error signal.

* * * * *

UNITED STATES PATENT AND TRADEMARK OFFICE
CERTIFICATE OF CORRECTION

PATENT NO. : 7,206,978 B2 Page 1 of 1
APPLICATION NO. : 10/857596
DATED : April 17, 2007
INVENTOR(S) : Kuzmenka et al.

It is certified that error appears in the above-identified patent and that said Letters Patent is hereby corrected as shown below:

Column 8, line 17; delete "unit" insert --units--
Column 8, line 23; delete "I" insert --1--
Column 8, line 36; delete "panty" insert --parity--

Signed and Sealed this

Nineteenth Day of June, 2007

JON W. DUDAS
*Director of the United States Patent and Trademark Office*